(12) United States Patent
Baum et al.

(10) Patent No.: US 8,346,043 B2
(45) Date of Patent: Jan. 1, 2013

(54) FIBER TRAY

(75) Inventors: Henry Baum, Livermore, CA (US);
Elva Mendoza, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 267 days.

(21) Appl. No.: 12/840,360

(22) Filed: Jul. 21, 2010

(65) Prior Publication Data
US 2011/0026895 A1   Feb. 3, 2011

Related U.S. Application Data (60) Provisional application No. 61/229,934, filed on Jul. 30, 2009.

(51) Int. Cl.
*G02B 6/00* (2006.01)
(52) U.S. Cl. .......................................... 385/135; 385/134
(58) Field of Classification Search .................... 385/135
See application file for complete search history.

(56) References Cited

U.S. PATENT DOCUMENTS

| | | | | |
|---|---|---|---|---|
| 4,687,289 A | | 8/1987 | DeSanti | 385/135 |
| 4,753,509 A | | 6/1988 | Parstorfer | 385/135 |
| 5,142,661 A | | 8/1992 | Grant et al. | 385/135 |
| 5,469,526 A | | 11/1995 | Rawlings | 385/135 |
| 5,659,641 A | | 8/1997 | DeMeritt et al. | 385/14 |
| 5,724,469 A | | 3/1998 | Orlando | 385/135 |
| 6,118,914 A | * | 9/2000 | Davis et al. | 385/37 |
| 6,130,982 A | * | 10/2000 | Diermeier et al. | 385/135 |
| 6,144,792 A | * | 11/2000 | Kim et al. | 385/135 |
| 6,192,180 B1 | * | 2/2001 | Kim et al. | 385/135 |
| 6,208,797 B1 | | 3/2001 | Vanderhoof et al. | 385/135 |
| 6,226,438 B1 | * | 5/2001 | Bylander et al. | 385/136 |
| 6,289,160 B1 | * | 9/2001 | Daoud | 385/135 |
| 6,301,423 B1 | * | 10/2001 | Olson | 385/135 |
| 6,334,020 B1 | * | 12/2001 | Fujimori et al. | 385/134 |
| 6,389,211 B1 | * | 5/2002 | Mandry et al. | 385/135 |
| 6,418,264 B1 | * | 7/2002 | Hough et al. | 385/135 |
| 6,427,034 B1 | | 7/2002 | Meis et al. | 385/14 |
| 6,427,045 B1 | * | 7/2002 | Matthes et al. | 385/135 |
| 6,567,602 B2 | * | 5/2003 | Cole et al. | 385/136 |
| 6,608,954 B2 | * | 8/2003 | Tamano et al. | 385/123 |
| 6,684,020 B2 | | 1/2004 | Wojcik | 385/135 |
| 6,741,784 B1 | | 5/2004 | Guan | 385/135 |
| 6,788,870 B1 | * | 9/2004 | Maxham et al. | 385/135 |
| 6,795,633 B2 | | 9/2004 | Joseph, II | 385/135 |
| 6,802,652 B1 | | 10/2004 | Sacchetto et al. | 385/59 |
| 6,819,857 B2 | | 11/2004 | Douglas et al. | 385/135 |
| 6,829,425 B2 | | 12/2004 | Barthel et al. | 385/135 |
| 6,847,775 B2 | | 1/2005 | Maruyama et al. | 385/135 |
| 7,130,498 B2 | | 10/2006 | Meis et al. | 385/14 |
| 7,239,783 B2 | * | 7/2007 | Yamamoto et al. | 385/123 |
| 7,376,324 B2 | | 5/2008 | Foord et al. | 385/135 |

(Continued)

*Primary Examiner* — Rhonda Peace
(74) *Attorney, Agent, or Firm* — Matthew A. Pequignot; Pequignot + Myers LLC (57) ABSTRACT

A fiber tray for routing and packaging an optical fiber is disclosed. The fiber tray includes a generally round central section, a lead-in section, and a lead-out section. All three sections are integrally formed out of a thin sheet of a material and coated with a tacky adhesive material for fiber retention. The adhesive allows for fiber removal and rerouting if required. The tray includes guiding walls, which establish the path of the optical fiber on the tray. The optical fiber is routed in a single layer on the tacky surface of the fiber tray. The optical fiber is supported and immobilized essentially along its entire length, including the length of the optical fiber routed on the lead-in and the lead-out sections.

18 Claims, 7 Drawing Sheets

U.S. PATENT DOCUMENTS

| | | | |
|---|---|---|---|
| 7,499,621 B2 * | 3/2009 | Vanhentenrijk et al. | 385/135 |
| 7,680,386 B2 * | 3/2010 | Hurley | 385/135 |
| 7,747,125 B1 | 6/2010 | Lee et al. | 385/135 |
| 7,751,674 B2 | 7/2010 | Hill | 385/135 |
| 7,813,598 B2 * | 10/2010 | Mortensen et al. | 385/12 |
| 7,899,296 B2 * | 3/2011 | Shukunami et al. | 385/135 |
| 2002/0118944 A1 * | 8/2002 | Burns et al. | 385/135 |
| 2002/0181923 A1 * | 12/2002 | Wojcik | 385/135 |
| 2004/0042754 A1 | 3/2004 | Arima et al. | 385/135 |
| 2004/0195132 A1 | 10/2004 | Sheetz et al. | 206/438 |
| 2008/0199139 A1 * | 8/2008 | Henderson | 385/135 |
| 2009/0060444 A1 * | 3/2009 | Muendel | 385/137 |
| 2009/0136195 A1 * | 5/2009 | Smrha et al. | 385/135 |
| 2010/0316346 A1 | 12/2010 | Krampotich et al. | 385/135 |
| 2011/0085775 A1 * | 4/2011 | Van Zuylen et al. | 385/135 |

* cited by examiner

WRAPPING MODULATOR FIBER - LOOSE

*FIG. 4C*

WRAPPING ITLA FIBER - LOOSE

FIBER TRAY

CROSS-REFERENCE TO RELATED APPLICATIONS

The present invention claims priority from U.S. Patent Application No. 61/229,934 filed Jul. 30, 2009, entitled "Molded Fiber Tray with Adhesive Surface for Fiber Retention" which is incorporated herein by reference for all purposes.

TECHNICAL FIELD

The present invention relates to packaging of optical fiber, and in particular to fiber trays for routing and packaging optical fiber within optoelectronic devices.

BACKGROUND OF THE INVENTION

Many modern electro-optical and optoelectronic devices include fiber-coupled components. Optical fibers of these components need to be routed within the devices. Optical fibers of different components or modules are coupled together by splicing. The splice locations need to be mechanically protected.

Optical fiber has a number of unique packaging requirements that are different from those of an electrical wire, for example. One such requirement is that of a minimal fiber bending radius. The capability of an optical fiber to guide light is limited. When the optical fiber is bent at a radius less than a so-called minimum bending radius, the fiber begins to leak some light at the bend. Furthermore, the capability of the optical fiber to bend without structural damage is also limited. Most optical fibers are made of thin polymer-coated fused silica strands. When the optical fiber is bent beyond a minimal radius, the fused silica strand can develop microcracks, which can result in a fiber breakage.

Another packaging requirement of optical fibers stems from somewhat random nature of an optical fiber splicing process. It is well known that no two splices are identical, and occasionally, a splicing operation will fail. When this occurs, an operator usually breaks the splice and splices the fibers again. To repeat the splicing, however, the operator needs to cut both optical fibers some length away (usually a few centimeters or more) from the splice break point, and prepare (strip and cleave) the fibers again. As a result of cutting the fibers, the total fiber length shortens and the optical fiber needs to be re-routed. To be able to reroute the fiber without an essential change of the fiber path within the device, the fiber is usually placed in loops within the device. For repeating the splicing operation, a length of the optical fiber, approximately equal to one loop length, is cut from both fibers being spliced, and the splicing operation is repeated. It is a good practice to loop the fibers at least three times on both sides of the splice point, to be able to repeat the splicing operation three times if so required.

Yet another packaging requirement of optical fibers results from a well-known "springing" property of optical fibers. Even thin singlemode fibers have a tendency to straighten when left unattached to a tray or a mount. Although some "memory" of previous fiber coiling is present, the fiber usually does not simply stay bent as most electrical wires would. This calls for restraining the optical fiber within the device using clips and bobbins.

Yet another packaging requirement of optical fibers results from sensitivity of optical performance of most optical fibers to a sharp mechanical stress, which is especially true for polarization-maintaining fibers. The optical fiber must be mechanically restrained in such a manner as to avoid sharp stress points on the fiber surface. In many cases, it is also preferable to prevent the optical fiber from randomly moving within the device.

One of the simplest and most frequently used methods of routing an optical fiber within a device includes coiling the fiber on a flat surface such as a printed circuit board, using multiple clips or clamps attached to the flat surface along the fiber path for restraining the fiber. Although simple, this method does not prevent the fiber from moving because the clips usually allow for some leeway to prevent sharp stresses on the fiber, which are detrimental as noted above. Furthermore, the fiber can easily get entangled in the clips during routing, and different operators can use the same clip patterns to route the fiber slightly differently or even completely differently, which impacts reproducibility and reworkability of the devices.

Figure 1:
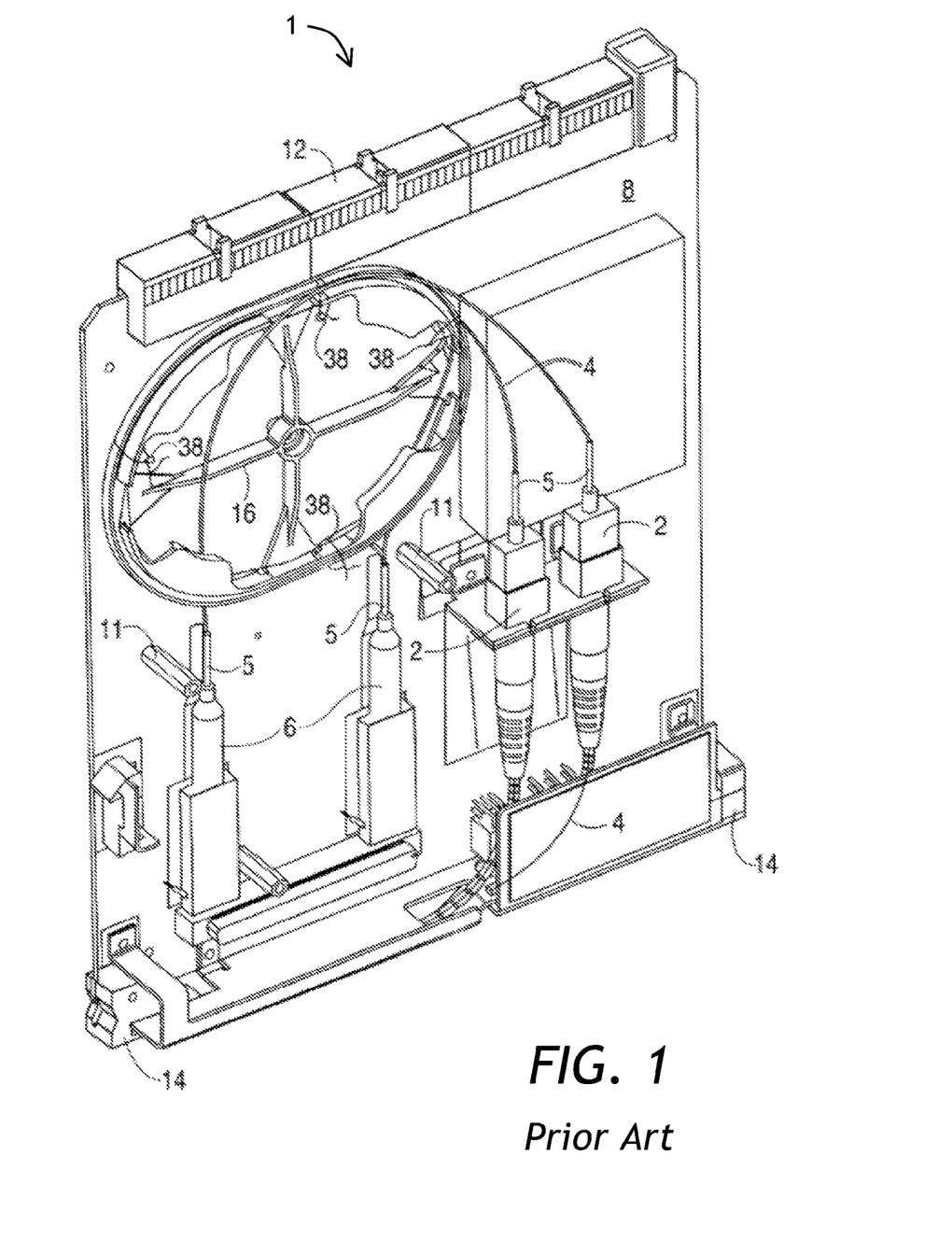
FIG. 1 is a three-dimensional view of a prior-art optoelectronic device having a bobbin for routing an optical fiber.

Another frequently used method is to use a fiber spool or bobbin for coiling the fiber. Referring to FIG. 1, a prior-art optoelectronic device 1 is shown including a printed circuit board 8 having mounted thereupon electrical connectors 12 and 14, standoffs 11, two electro-optical components 6, a bobbin 16, and two fiber connectors 2. The electro-optical components 6 are fiber coupled with optical fiber 4 through stress-relieving elements 5. The optical fiber 4 is wound on the bobbin 16. The optical fiber 4 is held in place on the bobbin 16 using fasteners 38. A detailed description of the optoelectronic device 1 is provided by Vanderhoof et al. in U.S. Pat. No. 6,208,797, which is incorporated herein by reference.

Disadvantageously, the bobbin 16 cannot prevent the optical fiber 4 from moving at locations where the optical fiber 4 is not wound on the bobbin 16. Furthermore, the bobbin 16 occupies valuable space on the printed circuit board 8, as well as large overall volume over the printed circuit board 8. In fact, a volume occupied by a prior-art bobbin, such as the bobbin 16, can be at least an order of magnitude greater than the volume occupied by the optical fiber 4 wound on the bobbin 16. Fiber bobbins disclosed by Grant et al. in U.S. Pat. No. 5,142,661 and by DeMeritt et al. in U.S. Pat. No. 5,659,641, incorporated herein by reference, have similar drawbacks.

Rawlings in U.S. Pat. No. 5,469,526, incorporated herein by reference, discloses an optical fiber support in form of an oval "raceway" for guiding an optical fiber. Disadvantageously, the optical fiber support of Rawlings does not provide an adequate means for immobilizing the fiber within the raceway. Also, the raceway of Rawlings takes a large fraction of the overall volume within a package of the device.

One method to immobilize an optical fiber without introducing an excessive mechanical stress is to use an adhesive surface with a tacky or a pressure-sensitive adhesive or simply using a single- or a double-sided sticky tape. Such an approach is disclosed, for example, by Parstorfer in U.S. Pat. No. 4,753,509, which is incorporated herein by reference, wherein an optical fiber is immobilized near fiber splice regions using "adhesive holding zones" placed near the fiber splices. Disadvantageously, the method of Parstorfer does little to immobilize the optical fiber in other regions of the device.

The prior art is lacking a fiber tray that supports and immobilizes the optical fiber substantially along its entire length within the device while providing a repeatable routing of the optical fiber along a uniquely defined path, without having to occupy a considerable height or volume inside the package. Accordingly, it is a goal of the present invention to provide such a fiber tray. Furthermore, a fiber tray of the invention, while being thin, allows for easy fiber rerouting after the fiber length has changed due to re-splicing.

SUMMARY OF THE INVENTION

A fiber tray of the invention is a thin, preferably monolithically formed, tray having narrow short walls uniquely defining a path of the optical fiber on a flat or nearly flat upper surface of the tray. The fiber tray has lead-in and lead-out sections, which may be disposed out of the plane of the upper surface, for supporting the fiber along most of its length inside the device, and an adhesive (tacky) layer on the upper surface for retaining the fiber after it has been routed. Due to the optical fiber being routed on a single even adhesive surface provided with lead-in and lead-out sections, the fiber tray of the invention occupies a much smaller overall volume than prior art fiber trays, while having enough rigidity to provide an adequate structural support for the optical fiber substantially along its entire length.

In accordance with the invention there is provided a fiber tray comprising:
    a support member having a substantially flat top surface for supporting at least one loop of an optical fiber;
    a lead-in member and a lead-out member, each having a top surface for guiding the optical fiber from an input location to the top surface of the support member to an output location, the top surface of the support member and the top surfaces of the lead-in and lead-out members together forming a continuous fiber carrying surface for supporting the optical fiber substantially along its entire length between the input and the output locations;
    first and second walls extending generally upwardly from the fiber carrying surface, so as to define, on both sides, a continuous guiding path for the optical fiber in going from the input location to the output location;
    and
    a mounting member for mounting the fiber tray;
    wherein the fiber carrying surface has an adhesive layer thereon, for affixing the optical fiber thereto.

In one embodiment, the fiber tray is formed out of a thin sheet of material, of the order of thickness of the optical fiber it is supporting, or even less than the thickness of the optical fiber, to minimize the overall thickness of the fiber tray. Due to the presence of the adhesive layer, traditional fiber restraining elements such as clips, straps, or high walls are not required, which allows the entire fiber tray to be very thin as noted above.

In accordance with another aspect of the invention there is further provided an optoelectronic assembly comprising the fiber tray and a printed circuit board, wherein the mounting member extends generally downwardly for mounting to the printed circuit board, such that the support member clears electronic components mounted on the printed circuit board.

In accordance with another aspect of the invention there is further provided a method of routing an optical fiber using the fiber tray, including:
    (a) attaching the fiber tray to a device having first and second fiber coupled components having first and second optical fibers;
    (b) routing the first optical fiber on the top surface of the lead-in member and coiling the first fiber on the flat top surface of the support member proximate to the first wall; and
    (c) routing the second optical fiber on the top surface of the lead-out member and coiling the second fiber on the flat top surface of the support member proximate to the second wall, in a direction opposite to a direction of coiling of the first fiber.

In accordance with yet another aspect of the invention there is further provided a method of building an optoelectronic device, including:
    (d) routing the optical fiber on the fiber tray;
    (e) marking the first and the second optical fibers proximate to a splice mounting location on the support member;
    (f) cutting the first and the second fibers at the marked locations;
    (g) splicing the first and the second fibers; and
    (h) re-routing the first and the second optical fibers so as to coil the first and the second optical fibers on the support member in opposite directions, and affixing the splice at the splice mounting location.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 2A:
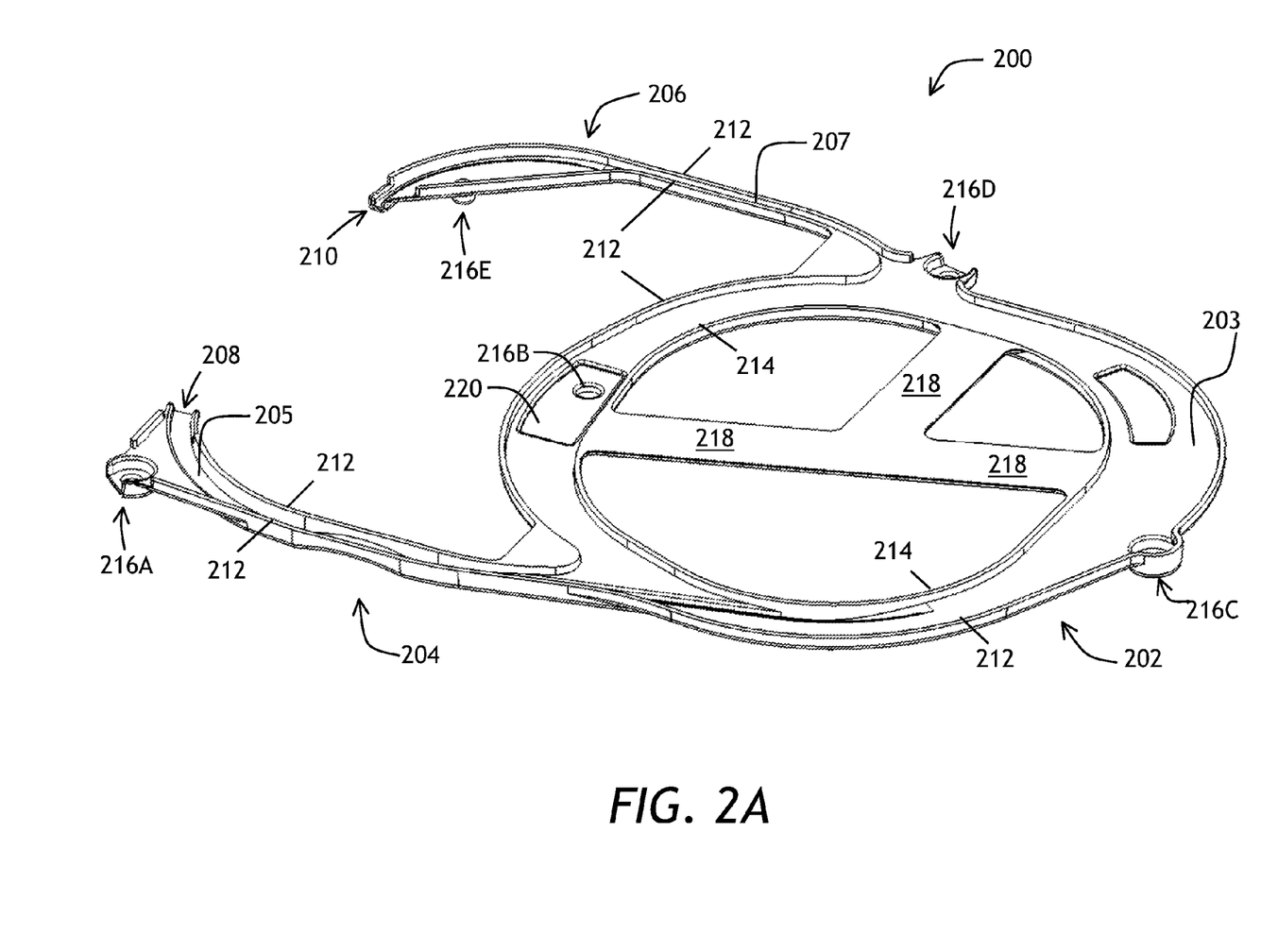
FIG. 2A is a three-dimensional view of a fiber tray of the present invention.
Figure 2B:
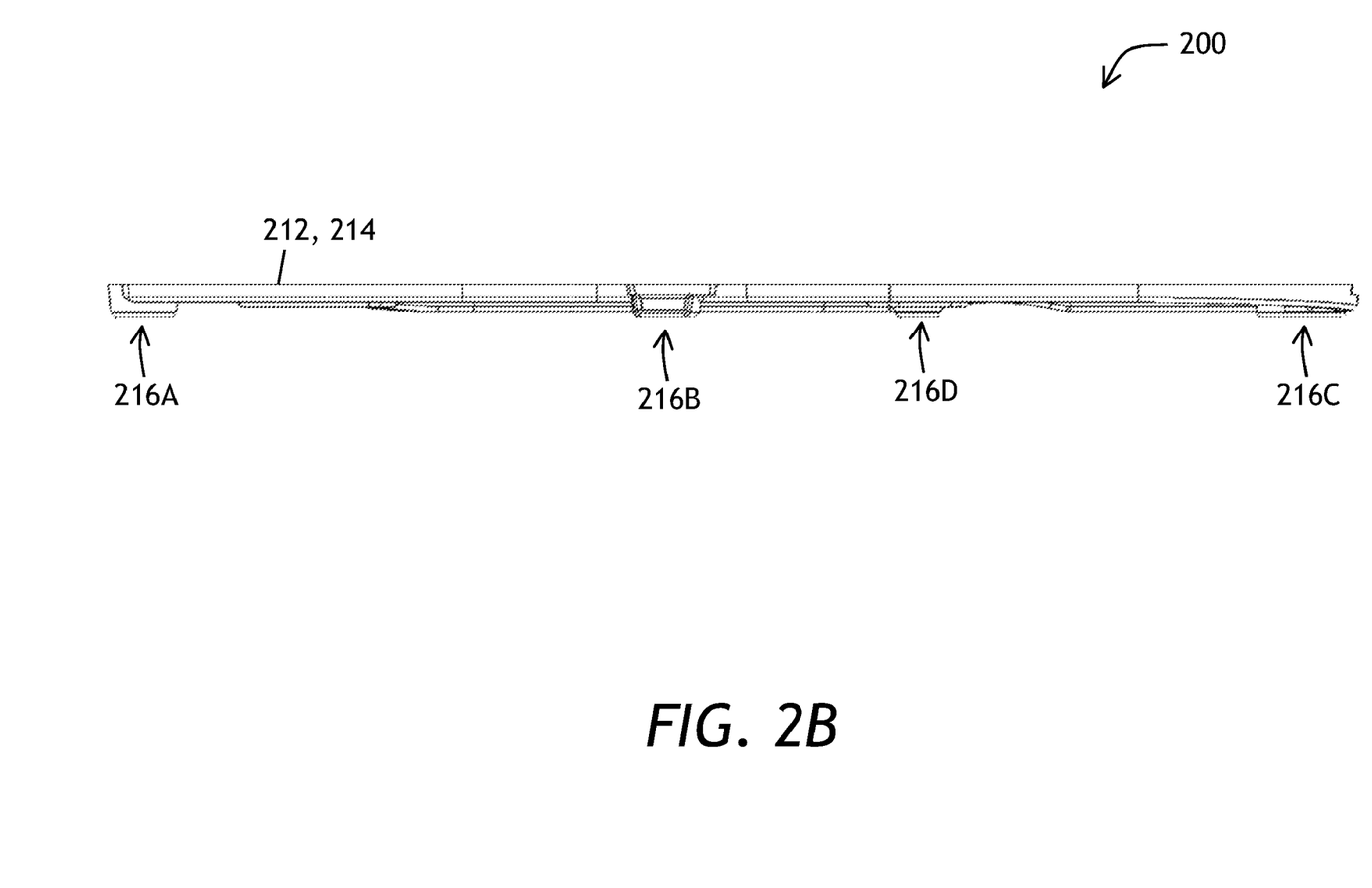
FIG. 2B is a side view of the fiber tray of FIG. 2A.

Referring to FIGS. 2A and 2B, a fiber tray 200 of the invention includes a support member 202 having a substantially flat top surface 203 for supporting at least one loop of an optical fiber, not shown; a lead-in member 204 having a top surface 205; and a lead-out member 206 having a top surface 207 for guiding the optical fiber from an input location 208 to the top surface 203 of the support member 202 to an output location 210. The top surfaces 205 and 207 of the lead-in and the lead-out members 204 and 206, respectively, together with the top surface 203 of the support member 202 form a continuous fiber carrying surface for supporting the optical fiber substantially along its entire length between the input and the output locations 208 and 210. The fiber carrying surface has an adhesive layer on top, not shown, for affixing the optical fiber to the surface. A "tacky" adhesive layer, allowing removal and repositioning of the optical fiber along a required path, is preferable. If the optical fiber needs to be moved, reworked, or repositioned, the adhesive layer provides an effective means of doing so without risking damaging the optical fiber. Other types of adhesive layers, such as curable epoxy layers, can also be used. The adhesive layer is preferably disposed over the entire fiber carrying surface.

The adhesive material to be applied to the fiber carrying surface of the fiber tray 200 should provide enough adhesion for the optical fibers 310A and 310B to be permanently attachable to the fiber tray 200. Yet, the adhesive should be yielding enough to allow the optical fibers 310A and 310B to be removable. Preferably, the adhesive should allow for fiber removal and re-routing for at least 30 days. If a rework is required after 30 days, the adhesive layer can be removed and re-applied to the tray 200, or the tray 200 can be replaced. The latter is actually preferable from the economical standpoint, because the tray 200 is very inexpensive when produced in large quantities, The fiber tray 200 includes outer and inner walls 212 and 214, respectively, extending upwardly from the fiber carrying surfaces 203, 205 and 207, so as to define a continuous guiding path for the optical fiber in going from the input location 208 to the output location 210. The walls 212 and 214 together define the guiding path on both sides of the path.

The fiber tray 200 further includes mounting members 216A to 216E for mounting the fiber tray 200. In the embodiment shown, five mounting members 216A to 216E are used, although any number, including only one suitably placed mounting member, can be used. The mounting members 216A to 216E extend generally downwardly from the support member 202, lead-in member 204, and the lead-out member 206, for mounting to a base, not shown. The support member 202 includes a recessed splice mounting location 220 for mounting a fiber splice, not shown.

The fiber tray 200 further includes optional rigidity bars 218, for increasing rigidity of the support member 202. The walls 212 and 214 function as "rigidity ribs", thereby improving overall rigidity of the fiber tray 200. As a result, the fiber tray 200 is thin but rigid enough to reliably support the optical fiber routed on its fiber carrying surface. The support member 202, the lead-in and the lead-out members 204 and 206, respectively, the walls 212 and 214, and the mounting members 216A to 216E are preferably integrally formed using a suitable manufacturing process such as injection molding or vacuum forming.

Figure 3:
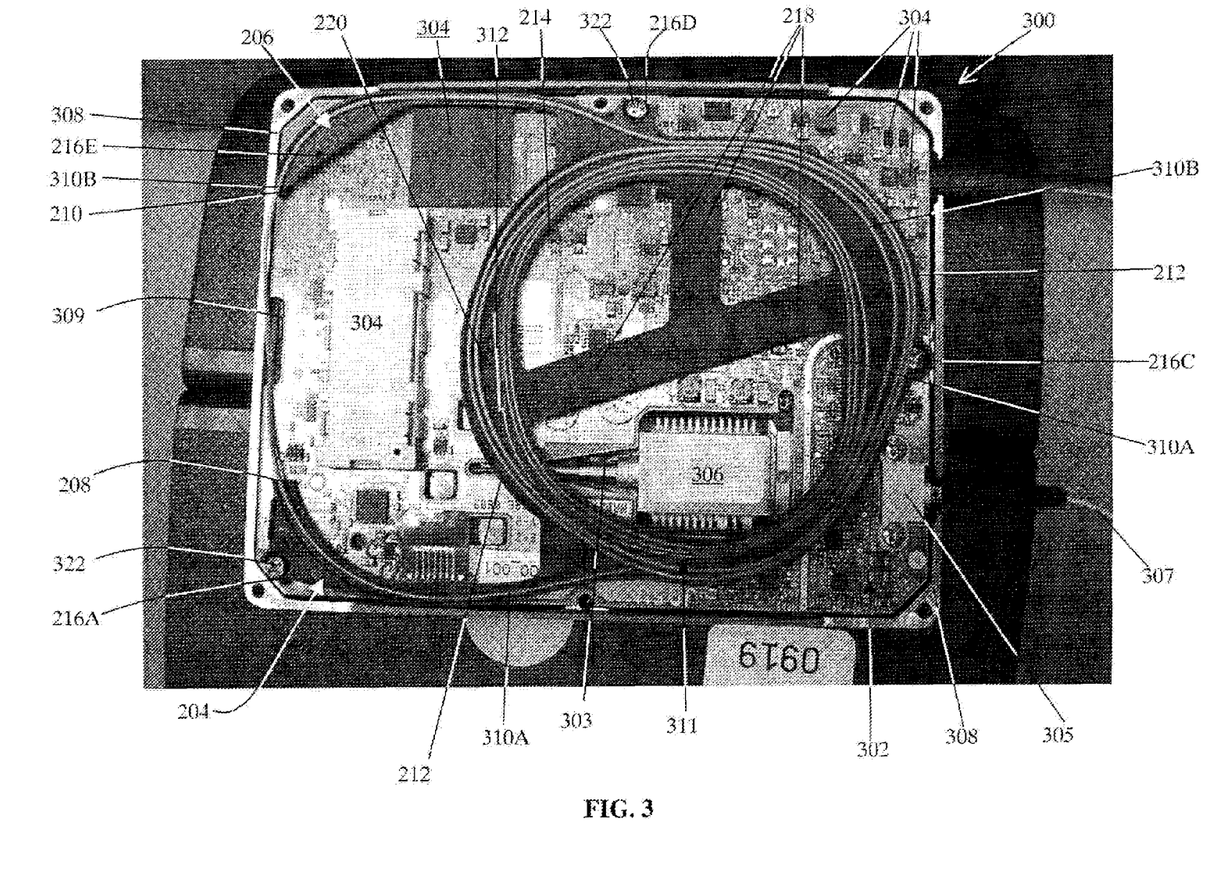
FIG. 3 is a top view of a transponder device of the invention having the fiber tray of FIGS. 2A and 2B for fiber routing and support.

Referring now to FIG. 3, a transponder device assembly 300 has the fiber tray 200, a printed circuit board 302 populated with electronic components 304, a receiver photodiode 305, a transmitter laser diode 306, a modulator, not shown, for modulating light of the transmitter laser diode 306, and an enclosure 308 supporting the printed circuit board 302, the receiver photodiode 305, the transmitter laser diode 306, and the fiber tray 200. The transmitter laser diode 306 (also called "Integrated Tunable Laser Assembly", or ITLA) is mounted below a level of the printed circuit board 302, and is disposed in an opening 303 in the printed circuit board 302.

The receiver photodiode 305 is coupled to an optical fiber 307 that is external to the enclosure 308. The modulator is coupled to an optical fiber 310A that is fed through a slot 309 in the printed circuit board 302 towards the input location 208. The modulator is disposed under the printed circuit board 308 and not seen in FIG. 3. The optical fiber 310A is supported by the lead-in member 204, being routed proximate to the inner wall 214 of the support member 202 of the tray 200. The optical fiber 310A is looped three times on the top surface 203 of the support member 202 so as to form a flat spiral having a gradually increasing radius, without overlapping. The optical fiber 310A ends at a splice 312 mounted at the splice mounting location 220. The splice 312 couples the optical fiber 310A with an optical fiber 310B leading to the transmission laser diode 306. The laser diode optical fiber 310B is looped three times on the top surface 203 of the support member 202 proximate to the outer wall 212 thereof, so as to form a flat spiral having a gradually decreasing radius. The laser diode optical fiber 310B is supported by the lead-out member 206, down to the output location 210. The laser diode optical fiber 310B is fed through the same slot 309 in the printed circuit board 302 and toward the laser diode 306. The top surface 203 of the support member 202 and the top surfaces 205 and 207 of the lead-in and lead-out members 204 and 206, respectively, together form the continuous fiber carrying surface for supporting the optical fibers 310A and 310B substantially along the entire length between the input and the output locations 308 and 310, except for a short length over the fiber splice mounting location 220, and a lead-in location 311 wherein the modulator optical fiber 310A enters the upper surface 203 of the support member 202. The fiber carrying surface at the input and the output locations 308 and 310 is at a lower height than a height of the flat top surface 203 of the support member 202. Thus, the lead in and lead out members 204 and 206, respectively, provide a smooth and continuous fiber support as they ramp up and down to the top surface 203 of the support member 202.

One of the key advantages of the fiber tray 200 of the invention is that it can be made very thin, thus saving valuable space within the package 308, allowing the package 308 to be thinner and/or providing more space for heat removal through air convection. The fiber tray 200 can me made out of a thin plastic sheet having a thickness smaller than a diameter of the optical fibers 310A or 310B. A practical range for the flat sheet thickness is between 0.04 mm to 1.0 mm. The flat sheet is preferably less than 0.6 mm thick. The inner and the outer walls 214 and 212 are preferably less than 1.5 mm high, but taller than a diameter of the optical fiber 310A and 310B, so that the walls 212 and 214 can protect the optical fiber 310A and 310B when the fiber tray 200 is placed upside down on a flat surface, or when it is covered with a flat sheet of material. For example, for a standard 0.9 mm diameter optical fiber, the walls 212 and 214 can be 0.9 mm to 1.0 mm high. The fiber tray 200 can be made so thin that it occupies a geometrical volume inside the enclosure 308, comparable to the geometrical volume occupied by the optical fibers 310A and 310B themselves. By way of example, in the transponder device assembly 300, the optical fibers 310A and 310B occupy a total volume of approximately 1000 $mm^3$, and the fiber tray occupies a volume of approximately 2000 $mm^3$.

The mounting members 216A to 216E extend downwardly (away from the viewer in FIG. 3) for mounting to the printed circuit board 302. The height of the mounting members 216A to 216E is selected so that the support member 202 clears the electronic components 304 mounted on the printed circuit board 302. The mounting members 216A, 216C, and 216D are affixed to the printed circuit board 302 at locations wherein the printed circuit board 302 is attached to the enclosure 308 using common screws 322, thus making more area on the printed circuit board 302 available for mounting the electronic components 304. The mounting members 216B and 216E are support legs for supporting the fiber tray 200. The mounting members 216B and 216E also serve as alignment features for aligning the fiber tray 200 to the printed circuit board 302.

Still referring to FIG. 3, the fiber tray 200 is dimensioned to support up to six loops of a standard 0.9 mm optical fiber arranged in a flat spiral. A total length of the optical fibers 310A and 310B is about 1700 mm. The dimensions and shape of the fiber tray 200 are such that a minimum bending radius of 25 mm is guaranteed along the entire fiber length. Unlike in prior-art spools and bobbins, the optical fibers 310A and 310B are supported in a single layer.

Although the fiber tray 200 is shown as having only two lead-in/lead-out members 204 and 206 and only one fiber mounting location 220, a fiber tray of the invention can have more lead-in or lead-out members and more splice mounting locations, as required. The top surfaces of these lead-in and lead-out members are preferably disposed at different heights for avoiding one segment of an optical fiber crossing another while resting thereupon, to avoid a sharp bending of the optical fiber.

Figure 4A:
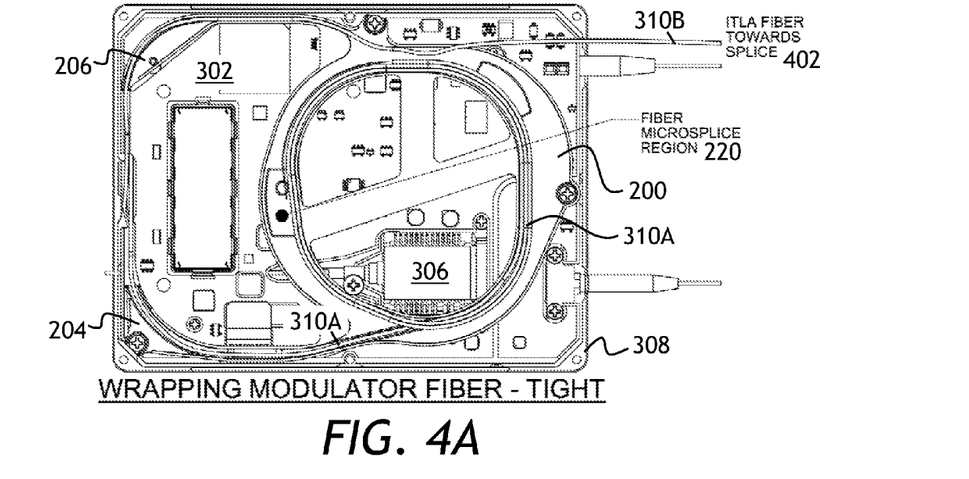
FIGS. 4A to 4D are top views of the transponder device of FIG. 3 as the optical fiber is routed on the fiber tray of the transponder device.
Figure 4B:
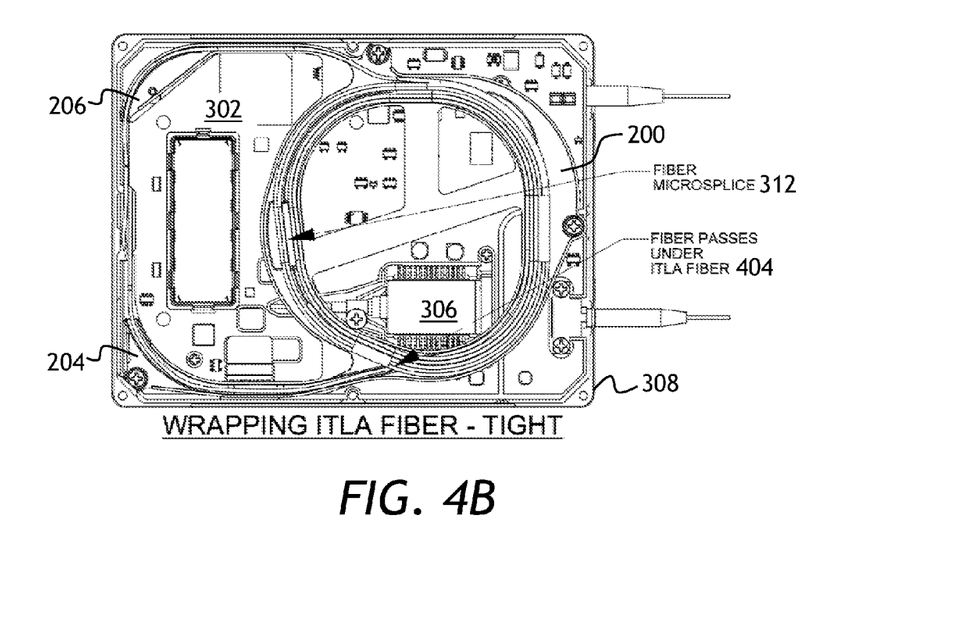

Turning now to FIGS. 4A and 4B, the process of fiber routing in the transponder device 300 is illustrated. The modulator fiber 310A is routed on the top surface 205 of the lead-in member 204 and is coiled on the flat top surface 203 of the support member 202 proximate to the inner wall 214, as shown in FIG. 4A. Three loops of the fiber 310A are formed. The laser fiber 310B is routed on the top surface 207 of the lead-out member 206, with the end 402 of the laser fiber 310B initially remaining free as shown at 402 in FIG. 4A, wherein the laser fiber 310B is called "ITLA fiber". Then, the laser fiber 310B is coiled on the flat top surface 203 of the support member 202 proximate to the outer wall 212 forming three loops. The laser fiber 310B is coiled in a direction opposite to a direction of coiling of the modulator fiber 310A, as shown in FIG. 4B. It is also seen in FIG. 4B that the laser fiber 310B is routed above the modulator fiber 310A at a location 404. The location 404 corresponds to the location 311 in FIG. 3.

Once both fibers 310A and 310B are coiled, they are marked proximate to the splice mounting location 220 on the support member 202. Then, the fiber coils are unwound, the fibers 310A and 310B are cut at a fixed offset from the marked locations, and the optical fibers 310A and 310B are spliced. Then, the optical fibers 310A and 310B are re-routed and re-coiled again, so as to coil the optical fibers 310A and 310B on the support member 202 in opposite directions. Then, the splice 312 is affixed to the support member 202 at the splice mounting location 220. Because the top surfaces 205, 207, and 203 of the fiber tray 200 are coated with an adhesive, the fibers 310A and 310B will remain coiled when the routing procedure is completed.

Figure 4C:
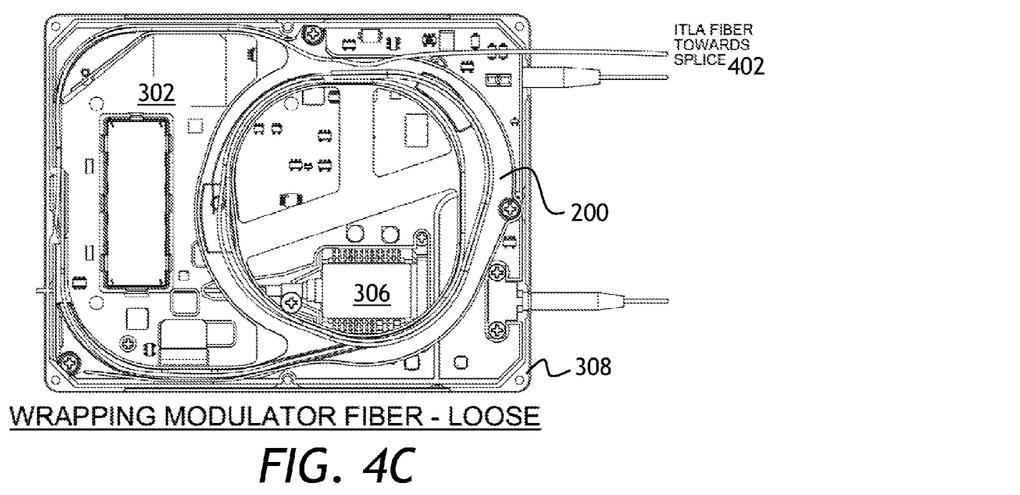
Figure 4D:
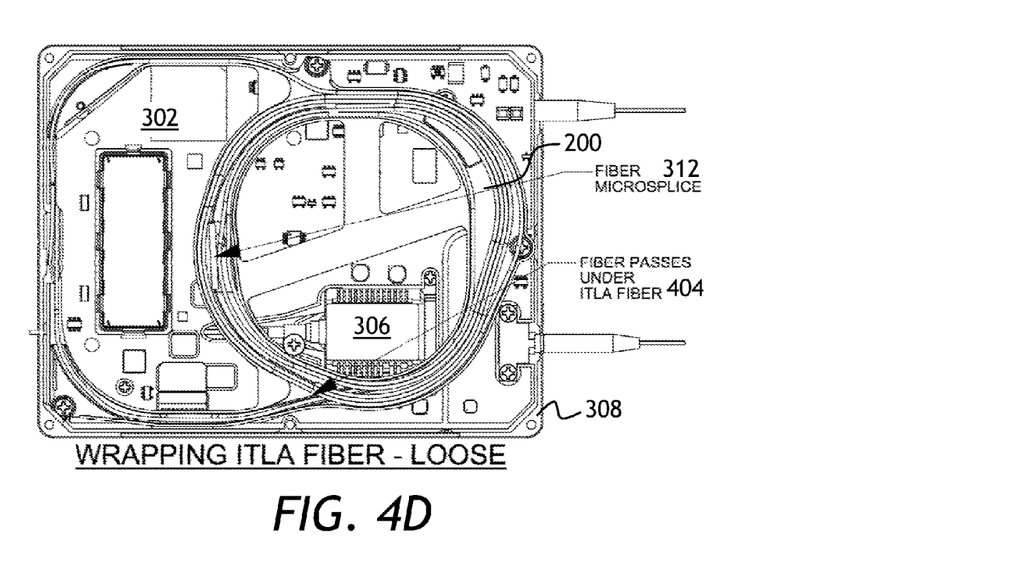

Referring to FIGS. 4C and 4D, the fiber routing procedure is illustrated again, but with the optical fibers 310A and 310B coiled not as tightly as is shown in FIGS. 4A and 4B. When the optical fibers 310A and 310B are coiled not as tightly, more fiber length can be accommodated on the fiber tray 200. This feature of the fiber tray 200 allows one to relax the fiber length tolerance.

Figure 5A:
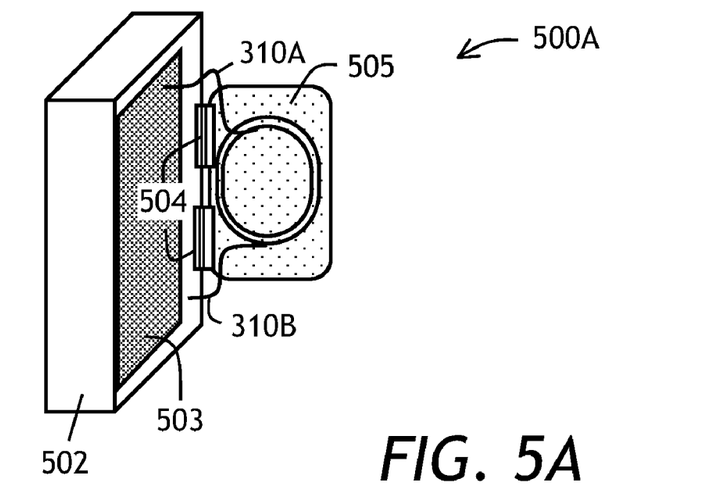
FIGS. 5A and 5B are views of devices having fiber trays of the invention mounted in a swing-out configuration along a side of the devices.

Turning to FIG. 5A, an optoelectronic assembly 500A is shown in a three-dimensional view. The fiber assembly 500A has a base 502, a printed circuit board 503 disposed in the base 502, and a fiber tray 505 mounted to the base 502 in a swing-out configuration. The fiber tray 505 is an embodiment of the fiber tray 200 of FIGS. 2A, 2B, 3, and 4A to 4D, having mounting members 504 that are different from the mounting members 216A to 216E. The mounting members 504 include swing members or hinges, that allow the fiber tray 505 to rotate out at an acute angle from an upper surface of the base 502, i.e. non-parallel to a plane of the upper surface of the base 502, for ease of fiber routing and also to provide an easy access to the printed circuit board 503. Ideally, the swing member 504 extends along a side of the base 502 and the printed circuit board 503 defining an axis of rotation for the fiber tray 505. The input/output locations of the optical fibers 310A and 310B are preferably disposed near the hinges 504, to allow the fiber tray 505 to be swing in and out of the plane of the base 502, while having the optical fibers 310A and 310B mounted thereon.

Figure 5B:
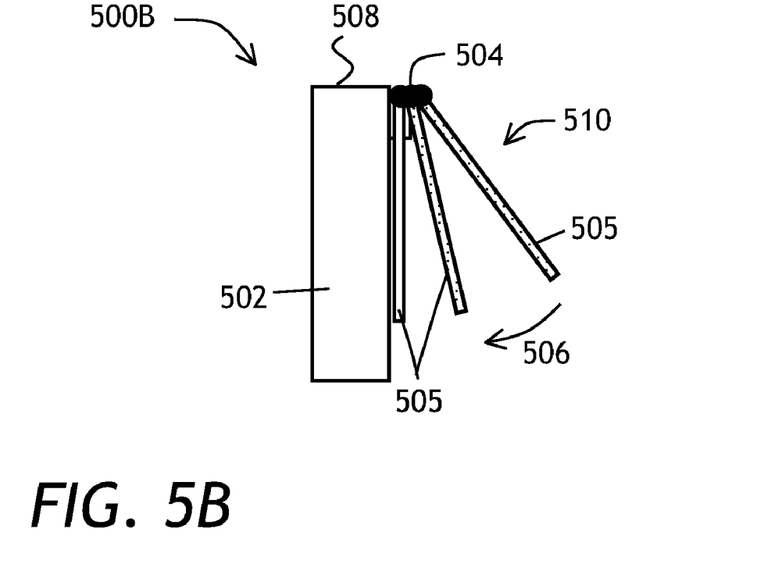

Since the fiber tray 505 is only about one millimeter thick, a "book" of a plurality of fiber trays 505 can be made. Referring to FIG. 5B, an optoelectronic assembly 500B is shown in a side view. A plurality of the mounting fiber trays 505 are included with all of the hinges 504 disposed along a same side 508 of the base 502. After all the optical fibers are routed, the "book" 510 can be "closed", as indicated at 506.

What is claimed is:

1. A fiber tray comprising:
   a support member having a substantially flat top surface for supporting at least one loop of an optical fiber;
   a lead-in member and a lead-out member, each having a top surface for guiding the optical fiber from an input location to the top surface of the support member to an output location, the top surface of the support member and the top surfaces of the lead-in and lead-out members together forming a continuous fiber carrying surface for supporting the optical fiber substantially along its entire length between the input and the output locations;
   first and second walls extending generally upwardly from the fiber carrying surface, so as to define a continuous guiding path for the optical fiber in going from the input location to the output location, the guiding path being defined on both sides thereof; and
   a mounting member for mounting the fiber tray;
   wherein the fiber carrying surface has an adhesive layer thereon, for affixing the optical fiber thereto;
   wherein the mounting member extends generally downwardly from the support member for mounting to a base; and
   wherein the mounting member includes a swing member for rotating the fiber tray away from the base.

2. The fiber tray of claim 1, wherein the support member, the lead-in and the lead-out members, the first and the second walls, and the mounting member are integrally formed.

3. A method of manufacturing of the fiber tray of claim 2, including integrally forming the fiber tray out of a plastic material.

4. A method of manufacturing of the fiber tray of claim 2, including injection molding or vacuum forming the fiber tray.

5. The fiber tray of claim 1, wherein the adhesive layer is disposed substantially over the entire fiber carrying surface, for affixing the optical fiber substantially along its entire length between the input and the output locations.

6. The fiber tray of claim 1, wherein the fiber carrying surface at the input or the output location is at a different height than a height of the flat top surface of the support member.

7. The fiber tray of claim 1, wherein the support member is a flat sheet 0.04 mm to 1.0 mm thick.

8. The fiber tray of claim 7, wherein the first and the second walls are less than 1.5 mm high.

9. The fiber tray of claim 8 having the optical fiber mounted thereupon, wherein the first and the second walls have a height larger then a diameter of the optical fiber.

10. The fiber tray of claim 1, wherein the support member includes a location for mounting a fiber splice.

11. A fiber tray assembly including a stack of the fiber trays of claim 1, wherein the swing members of the individual fiber trays are disposed along a same side of the base.

12. An optoelectronic assembly comprising the fiber tray of claim 1, and a printed circuit board, wherein the mounting member extends generally downwardly for mounting to the printed circuit board such that the support member clears electronic components mounted on the printed circuit board.

13. The optoelectronic assembly of claim 12, further including an enclosure for enclosing the printed circuit board and the fiber tray, and a fiber coupled module mounted within the enclosure, wherein the support member has an opening to accommodate the fiber coupled module.

14. An optoelectronic assembly comprising:
a fiber tray including:
a support member having a substantially flat top surface for supporting at least one loop of an optical fiber;
a lead-in member and a lead-out member, each having a top surface for guiding the optical fiber from an input location to the top surface of the support member to an output location, the top surface of the support member and the top surfaces of the lead-in and lead-out members together forming a continuous fiber carrying surface for supporting the optical fiber substantially along its entire length between the input and the output locations;
first and second walls extending generally upwardly from the fiber carrying surface, so as to define a continuous guiding path for the optical fiber in going from the input location to the output location, the guiding path being defined on both sides thereof; and
a mounting member for mounting the fiber tray;
wherein the fiber carrying surface has an adhesive layer thereon, for affixing the optical fiber thereto;
a printed circuit board, wherein the mounting member extends generally downwardly for mounting to the printed circuit board such that the support member clears electronic components mounted on the printed circuit board; and
an enclosure for enclosing the printed circuit board and the fiber tray, wherein the mounting member is affixed to the printed circuit board at a location wherein the printed circuit board is attached to the enclosure.

15. An optoelectronic assembly comprising:
a fiber tray including:
a support member having a substantially flat top surface for supporting at least one loop of an optical fiber;
a lead-in member and a lead-out member, each having a top surface for guiding the optical fiber from an input location to the top surface of the support member to an output location, the top surface of the support member and the top surfaces of the lead-in and lead-out members together forming a continuous fiber carrying surface for supporting the optical fiber substantially along its entire length between the input and the output locations;
first and second walls extending generally upwardly from the fiber carrying surface, so as to define a continuous guiding path for the optical fiber in going from the input location to the output location, the guiding path being defined on both sides thereof; and
a mounting member for mounting the fiber tray;
wherein the fiber carrying surface has an adhesive layer thereon, for affixing the optical fiber thereto;
a printed circuit board, wherein the mounting member extends generally downwardly for mounting to the printed circuit board such that the support member clears electronic components mounted on the printed circuit board;
an enclosure for enclosing the printed circuit board and the fiber tray; and
a fiber coupled module mounted within the enclosure, wherein the support member has an opening to accommodate the fiber coupled module;
wherein the fiber coupled module has an optical fiber attached to the fiber coupled module below a level of the printed circuit board having an opening or a slot therein for feeding the optical fiber therethrough towards the lead-in or the lead-out member of the fiber tray.

16. The optoelectronic assembly of claim 15, wherein the optical fiber is looped on the top surface of the support member so as to form a flat spiral having a gradually increasing or decreasing radius.

17. A method of routing an optical fiber using the fiber tray comprising
a support member having a substantially flat top surface for supporting at least one loop of an optical fiber;
a lead-in member and a lead-out member, each having a top surface for guiding the optical fiber from an input location to the top surface of the support member to an output location, the top surface of the support member and the top surfaces of the lead-in and lead-out members together forming a continuous fiber carrying surface for supporting the optical fiber substantially along its entire length between the input and the output locations;
first and second walls extending generally upwardly from the fiber carrying surface, so as to define a continuous guiding path for the optical fiber in going from the input location to the output location, the guiding path being defined on both sides thereof; and
a mounting member for mounting the fiber tray;
wherein the fiber carrying surface has an adhesive layer thereon, for affixing the optical fiber thereto,
the method including:
(a) attaching the fiber tray to a device having first and second fiber coupled components having first and second optical fibers;
(b) routing the first optical fiber on the top surface of the lead-in member and coiling the first optical fiber on the flat top surface of the support member proximate to the first wall; and
(c) routing the second optical fiber on the top surface of the lead-out member and coiling the second fiber on the flat top surface of the support member proximate to the second wall, in a direction opposite to a direction of coiling of the first fiber.

18. A method of building an optoelectronic device, including:
(d) routing the optical fiber using the method of claim 17;
(e) marking the first and the second optical fibers proximate to a splice mounting location on the support member;
(f) cutting the first and the second fibers proximate to the marked locations;
(g) splicing the first and the second fibers; and
(h) re-routing the first and the second optical fibers so as to coil the first and the second optical fibers on the support member in opposite directions, and affixing the splice at the splice mounting location.

* * * * *